June 23, 1964 R. H. STUCKERT Re. 25,605

SPACER INSERT IN A CONTAINER

Original Filed Sept. 27, 1961 2 Sheets-Sheet 1

INVENTOR:
ROBERT H. STUCKERT
BY
Robert W. Brukardt
AGENT

SPACER INSERT IN A CONTAINER

Original Filed Sept. 27, 1961 2 Sheets-Sheet 2

INVENTOR:
ROBERT H. STUCKERT

BY Robert W. Brukardt
AGENT

United States Patent Office

Re. 25,605
Reissued June 23, 1964

25,605
SPACER INSERT IN A CONTAINER

Robert H. Stuckert, Milwaukee, Wis., by Crown Zellerbach Corporation, San Francisco, Calif., a corporation of Nevada Original No. 3,107,780, dated Oct. 22, 1963, Ser. No. 141,173, Sept. 27, 1961. Application for reissue Dec. 2, 1963, Ser. No. 335,452
1 Claim. (Cl. 206—46)

Matter enclosed in heavy brackets [ ] appears in the original patent but forms no part of this reissue specification; matter printed in italics indicates the additions made by reissue.

This invention relates to a spacer insert adapted to position and protect an article in a shipping container. More particularly, the invention relates to a container insert, formed from a single sheet of bendable material, such as fibreboard, corrugated fibreboard or the like, and serving to positively position an article in spaced relation to the side walls and one end closure of the shipping container.

The invention provides a container insert that may be formed by the simple folding of a single blank of material. Nevertheless, the insert is eminently satisfactory for the packaging of tall, heavy articles such as water heaters which must be stabilized in spaced relation within the confines of a container and protected from shock and abrasion.

The insert may be preassembled and positioned over and in engagement with an article in a container prior to the final closure of the top of the container. An important feature of the invention is that the insert circumferentially engages the article in the container about a determined end portion thereof and provides a multiple thickness of the material forming the insert in flatwise relation to paired diametrically opposite portions of the article to positively position and cushion the article. There are further provided top end panels hingedly connected to a interior portion to the container insert and serving to cushion and vertically space the article in the container from the final closure thereof. These top end panels further serve to maintain the insert in precise disposition in the container so that the article in the container is circumferentially engaged about a precise transverse section thereof.

Other objects and advantages of this invention will be apparent to those skilled in the art upon a full and complete understanding of the construction of the container insert. The accompanying drawings illustrate an embodiment of the invention and form a part of the specification. Like numerals and symbols therein appearing refer to like parts wherever they occur.

Figure 3:
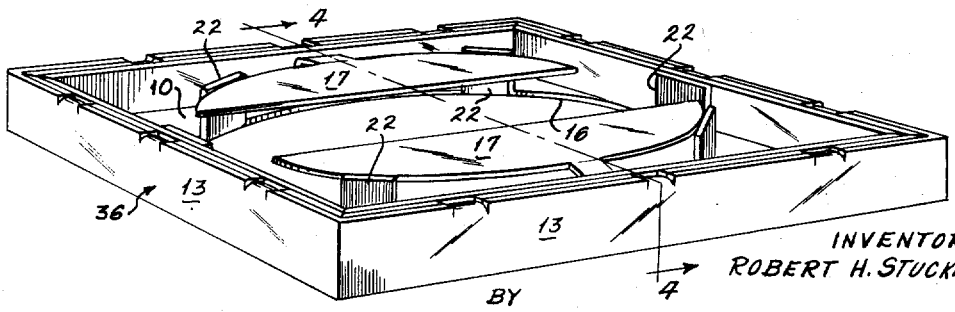

FIG. 3 in a perspective view of a container insert fully erected and ready for insertion in a container.

Figure 4:
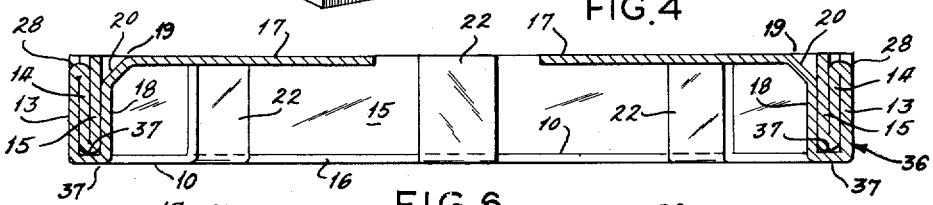

FIG. 4 is a cross sectional view through line 4—4 of FIG. 3.

Figure 5:
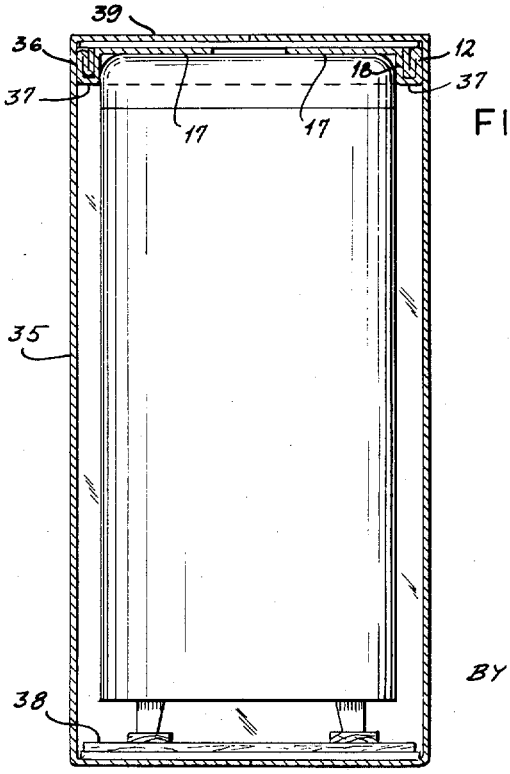

FIG. 5 is a cross sectional view of the insert in the container engaging and protecting a water heater therein.

Figure 6:
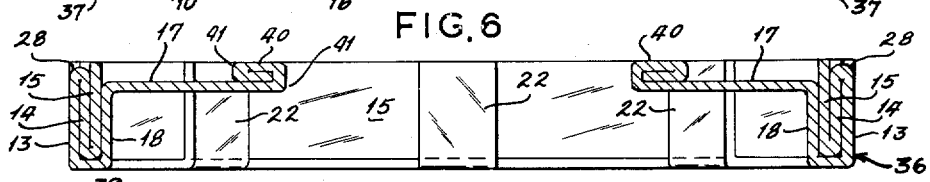

FIG. 6 is a cross sectional view similar to FIG. 4 but showing a modified insert providing additional top cushioning and spacing.

Figure 7:
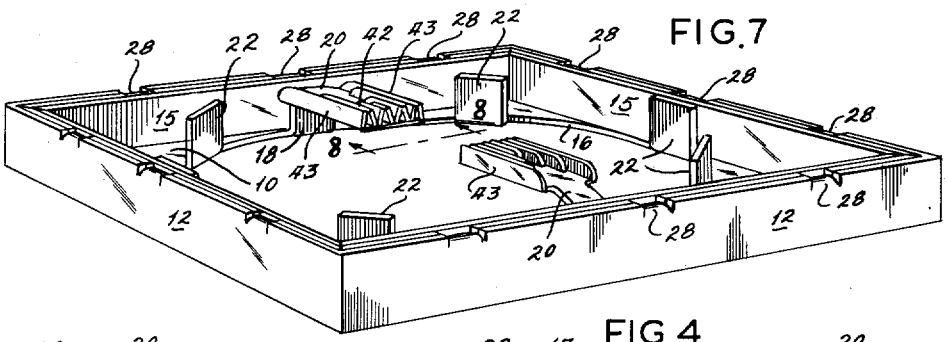

FIG. 7 is a perspective view of a container insert in erecting condition with the top panels fan folded to form spacing bars.

Figure 8:
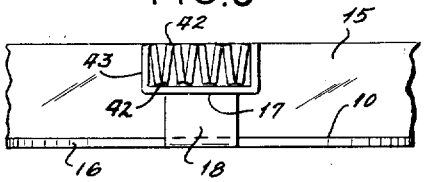

FIG. 8 is a cross sectional view of a spacing bar through line 8—8 in FIG. 7.

Figure 2:
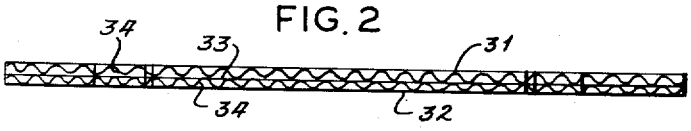
FIG. 2 is a cross sectional view of double wall corrugated board, the preferred material for constructing the container insert.

For purposes of simplicity and clarity of description the following description will particularly set forth a description of an embodiment of the invention particularly adapted for packaging water heaters which is illustrative of the capability of the simple and economical insert to position and protect tall, heavy articles in a container. For this particular commercial embodiment of the invention it has been found that doublewall corrugated board, shown in cross section view FIG. 2, provides the desired strength and cushioning characteristics, but it is evident that for smaller or lighter articles ordinary doubleface corrugated board or fibreboard may be used with facility.

Figure 1:
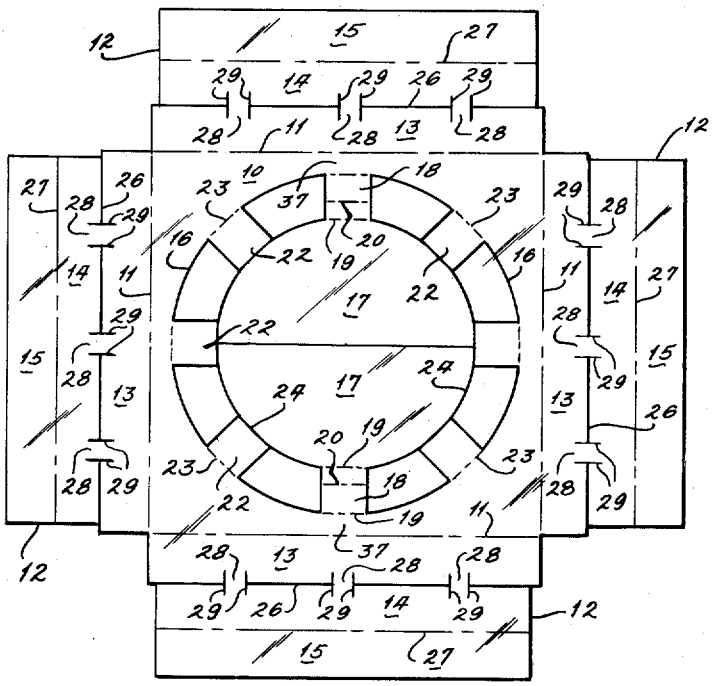
FIG. 1 is a plan view illustrating the blank from which an embodiment of the container insert is formed.

The blank for the insert, top view shown in FIG. 1, may be conveniently formed by die-cutting a flat sheet and comprises a base panel 10 which conforms closely to a transverse section of the container and has outer edges defined by flap scores 11. The flap scores 11 further serve as the hinge connection of the spacer flaps 12 which are further sub-divided into an outer flap 13, intermediate flap 14 and inner flap 15.

In the base panel 10 there is an interior edge 16 spaced from the base panel edges 11 and adapted to conform closely to the outer perimeter of a transverse section of the article to be placed in the container. A pair of top panels 17 are each foldably connected to opposite portions of the interior edge 16 by connecting webs 18. The connecting web hinge lines are determined by score lines 19, represented as dotted lines in the drawing, which may be either deeply impressed or perforated in the die cutting operation. In addition the connecting webs are provided with a contour score line 20 which may be desirable when the container insert is used for packaging a water heater having substantially rounded top edges so that the connecting webs and top panels 17 may conform closely to the contours of the water heater.

Tabs 22 are hingedly connected to the interior edge 16 by score lines 23 but are otherwise defined by free edges 24 so that they are independent of each other and of the tops panels 17.

In the spacer flaps 12 the outer flap 13 and intermediate flap 14 are hingedly connected about their adjacet edges indicated by line 26. The intermediate flap and inner flap are in turn hingedly connected by score line 27. Since the blank A is constructed from doublewall board, as is shown in cross section in FIG. 2, when the insert is to be used for packaging water heaters or comparable tall heavy articles, the folding of the spacer flaps 12 may be implemented by the use of particular fold connections. For example, the line of hinge connection along line 26 is preferably provided with spaced apart hinge webs 28 which are defined by transverse slit edges 29. The outer flap 13 and intermediate flap 14 are otherwise separated by a slit alone line 26. The intermediate spacer flap 14 and inner spacer flap 15 are hingedly connected by the beforementioned score line 27 which is preferably a cut score being partially severed in the die cutting operation, but leaving at least the bottom facing liner of the blank intact.

It will be noted further in respect to the spacer flaps that the outer flap 13 is substantially coterminous in width with the respective edges of the base panel whereas the intermediate flap 14 and inner flap 15 are shortened in width in respect thereto for reasons which will be hereinafter described in regard to the erected container insert.

The doublewall board for forming the container shown in FIG. 2 in cross sectional view is comprised of a facing sheet 31, a second facing sheet 32, and an intermediate facing sheet 33 which are each separated by and secured to corrugated sheets 34. This type of corrugated board provides great structural strength and, in addition, provides the desired cushioning qualities and thickness for adequate spacing of the water heater from the walls and end closure of the enclosing container.

To erect the container insert to operative condition as shown in FIG. 3, the spacer flaps 12 are successively folded to form multiple ply spacer walls 36 in normal relation to the base panel 10 in FIG. 1 and overlying the marginal edge portions 37 of the base panel intervening the flap scores 11 and the interior edge 16, which may be defined by the connecting web score lines 19 or tab score lines 23. The folding of the spacer flaps may be accomplished by folding the successive hinge connections or score lines in an alternating fashion to form fan folds or they may be folded successively in one direction to roll-up the spacer wall. While the spacer walls may be formed of a varying number of plies, it has been found desirable to form a three ply wall, as shown in the drawings, to attain the desired spacing about a water heater in a container when the container spacer insert is constructed of double wall board. It is to be noted that the side edges 37 of the intermediate and inner spacer flaps 14 and 15, are recessed in a suitable manner to permit the disposition of the spacer walls 36 over the base panel 10.

In FIG. 4 is illustrated a cross sectional view through line 4—4 of FIG. 3. Thus it may be observed that the spacer flaps 12 are disposed overlying and in normal relation to the marginal edge portion 37 of the base panel as before stated. In this view the spacer flaps 12 are fan folded about the hinge webs 28 and a cut score line 27. This construction provides ease of folding of the heavy double-wall board and reduces the springiness that would be encountered with conventional depressed score lines. A further advantage of this construction is that it lends itself to die cutting the blank from one side with a relatively simple die.

The spacer flaps 12 are supplemented in this cross sectional view by the connecting webs 18 to form the complete effective thickness of the spacer wall 36. In this view, the connecting webs 18 are scored at 20 to adapt the connecting webs to the contour of a rounded edge water heater. The top panels 17 extend inwardly in a generally horizontal direction from their fold connection 19 with the connecting webs.

The spacer insert is shown positioned over the top end of a water heater and enclosed in a container 35 in FIG. 5. The spacer insert is shown in the same cross sectional view as in FIG. 4. The container 35 may be of any suitable conventional construction as for example the container shown in the Beaman Patent No. 2,214,220, "Multi-Wall Bulk Pak Shipping Containers" or a slotted carton having foldably connected walls in tubular relation and flap closures on the ends. A slotted carton is illustrated in the drawings.

The spacer insert is positioned over the water heater prior to the closure of the container top closure 39. It may be seen that the spacer flaps 12 and the connecting webs 18 provide a positive spacing of the water heater top side edges from the container walls and in addition the top panels 17 overlie the water heater and provide positive spacing between said heater and the container top closure. The insert is frictionally retained in position prior to positioning the end closure of the container, but thereafter the disposition of the insert in the container is positively restrained against downward movement by the engagement of the top panels between the heater and the container closure. Further the spacer flaps being in edgewise abutment with the inner surface of the container closure insures that the spacer wall 36 is fixedly retained about the desired end portion of the water heater. Suitable bottom spacer means 38 is provided in the container to fixedly position the water heater supporting legs in the container in accordance with common practice.

It may be desirable, particularly for water heaters and other like heavy articles, to provide additional spacing between the top end of the article in the container and the container closure. To effect this result the spacer insert may be suitably modified to provide additional spacer means by folding the top panels 17 into spacing bars 40 of a suitable thickness. This may be accomplished by transversely scoring said top panel along parallel spaced apart lines of fold and rolling up said scored top panel portions as shown in FIG. 6. FIG. 6 is a cross sectional view similar to FIG. 4 but shows the top panel 17 folded about transverse scores 41 to provide the multiple thickness spacing bars 40. This construction will provide two spaced apart preferably parallel spacing bars 40 which adequately cushion and space the water heater top end from the container top end closure.

An alternative construction which may provide spacing bars of greater vertical height is illustrated in FIG. 7 which is a perspective view of a container insert in erected condition. Here the top panel 17 is suitably scored along longitudinal spaced apart lines of weakness 42 to define panel portions 43 which are fan folded into flatwise relation to each other and in normal relation to the water heater top end and container closure.

In FIG. 8 is illustrated a cross sectional view through line 8—8 of FIG. 7. In this view the spacing bar 40 is formed from a top panel 17 by fan folding the panel portions 43 about the parallel spaced apart lines of weakness 42. The spacing bar 40 is spaced from the base panel 10 by the connecting web 18. In this view, the spacing bar is slightly expanded for purpose of clarity, but it is understood that it will normally be desirable to have the panel portions 43 in compact flatwise relation to each other. The panel portions 43 are folded and disposed in overlying and normal relation to a center portion of the top panel 17 which is in alignment with the connecting web 18.

It will generally be found convenient to secure the rolled or fan folded spacing bars 40 by the use of suitable adhesive or tape to maintain the panel portions in contacting flatwise relation during packing and shipment of the container.

The spacer insert for a container, as described in the preceding, provides a simple one-piece integral insert for a container which cushions and positively spaces a water heater from the walls and top end closure of an enclosing container. This result is attained, even though the spacer insert is formed from a simple rectangular blank, as the blank is suitably cut and scored to permit the folding of the panels and parts thereof to provide multiple thicknesses of the material between the water heater and the adjacent container parts. Thus the dependence on critical or elaborate constructions heretofore known in the art is avoided and the simple spacer insert is capable of maintaining its effectiveness under the severe stresses encountered in handling and shipment of water heaters in containers.

While, in the view shown, the spacer bars are formed from the generally semi-circular top panels 17 for uniformity in the several drawings, it is an obvious expedient to form the top panels 17 in a substantially rectangular form. This may be accomplished by reducing certain of the tabs 22 which are not in contacting relation with the spacer walls 36. By this means the spacing bars may be of substantially uniform character throughout their length.

Since the top panels 17 or spacing bars 40 formed therefrom are spaced apart in the erected condition of the spacer insert, adequate provision may be made for protruding pipe connectors or nipples extending from the top end of the water heater. When such protrusions extend to a substantial height above the heater the fan folded form of spacing bars illustrated in FIGS. 7 and 8 is preferred as the necessarily limited amount of material available in the top panel 17 may be utilized to form a spacing bar of substantial vertical height. Obviously because of the limited amount of material it will be necessary to vary the number of plies or panel portions 43 in accordance with the height desired.

It is to be understood that the invention may be susceptible of other modified forms and that the embodiments herein described are illustrative and not restrictive. All such modifications which are similar or equivalent hereto come equally within the scope of the claims next appearing.

I claim:

[1. In a container having vertical walls in polygonal formation and a top closure enclosing an article of manufacture, a spacer insert for positioning over and in circumferential engagement with the article to laterally space the article from the vertical side walls of the container, said insert comprising a unitary blank having a base panel horizontally disposed about a transverse section of the said article and having an interior edge defining an article receiving void therein, the base panel having outer edges in outwardly spaced relation from said interior edge and in contacting relation to the container inner wall surfaces partially spacing the article from the said side walls, integral spacer walls foldably connected to said base panel outer edges and disposed in overlying relation to marginal edge portions of said base panel intervening the points of contact with the article and side walls of the container, the spacer walls being comprised of spacer panels foldably connected and disposed in mutual flatwise relation and in vertical disposition to the base panel, projections from said interior edge adjacent the spacer walls folded in flatwise contacting relation to the interior surface of the spacer walls and in combination therewith providing multiple ply continuous lateral spacer means in flatwise vertical relation and parallel to the container side walls and disposed between the container side walls and the article, integral separable top spacer means in spaced relation to the base panel and integrally and foldably connected to two of said interior edge projections, the top spacer means in contacting relation with and disposed between the end of the article in the container and the top closure and effectively spacing the same and positioning the spacer insert in relation to the article.]

[2. The spacer insert claimed and described in claim 1, wherein the separable top spacer means comprises a spacer bar having integral panel portions, said panel portions folded to form a greater thickness than the unitary blank from which the spaced insert is formed.]

*3. In a container having vertical walls in polygonal formation and a top closure enclosing an article of manufacture, a spacer insert for positioning over and in circumferential engagement with the article to laterally space the article from the vertical side walls of the container, said insert comprising a unitary blank having a base panel horizontally disposed about a transverse section of the said article and having an interior edge defining an article receiving void therein, the base panel having outer edges in outwardly spaced relation from said interior edge and in contacting relation to the container inner wall surfaces partially spacing the article from the said side walls, integral spacer walls foldably connected to said base panel outer edges and disposed in overlying relation to marginal edge portions of said base panel intervening the points of contact with the article and side walls of the container, the spacer walls being comprised of spacer panels foldably connected and disposed in mutual flatwise relation and in vertical disposition to the base panel, projections from said interior edge adjacent the spacer walls folded in flatwise contacting relation to the interior surface of the spacer walls and in combination therewith providing multiple ply continuous lateral spacer means in flatwise vertical relation and parallel to the container side walls and disposed between the container side walls and the article, integral separable top spacer means in spaced relation to the base panel and integrally and foldably connected to two of said interior edge projections, the top spacer means comprising a spacer bar having integral panel portions, said panel portions folded to form a greater thickness than the unitary blank from which the spacer insert is formed, the top spacer means in contacting relation with and disposed between the end of the article in the container and the top closure and effectively spacing the same and positioning the spacer insert in relation to the article.*

References Cited in the file of this patent or the original patent

UNITED STATES PATENTS

| | | |
|---|---|---|
| 2,740,574 | Laver | Apr. 3, 1956 |
| 2,905,315 | Doll | Sept. 22, 1959 |
| 2,932,438 | Smith | Apr. 12, 1960 |
| 2,936,880 | Kohlhaas | May 17, 1960 |